(12) United States Patent
Miwa et al.

(10) Patent No.: US 8,971,249 B2
(45) Date of Patent: Mar. 3, 2015

(54) TERMINAL DEVICE AND DATA TRANSMISSION/RECEPTION METHOD

(75) Inventors: Yasutaka Miwa, Tokyo (JP); Tetsuo Watanabe, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 86 days.

(21) Appl. No.: 13/605,446

(22) Filed: Sep. 6, 2012

(65) Prior Publication Data

US 2013/0155950 A1 Jun. 20, 2013

(30) Foreign Application Priority Data

Dec. 14, 2011 (JP) ................. 2011-273735

(51) Int. Cl.
- *H04W 4/00* (2009.01)
- *H04W 8/00* (2009.01)
- *H04W 8/18* (2009.01)
- *H04W 84/18* (2009.01)

(52) U.S. Cl.
CPC .............. *H04W 8/005* (2013.01); *H04W 84/18* (2013.01); *H04W 8/186* (2013.01)
USPC .......................................... 370/328; 370/332

(58) Field of Classification Search
CPC .............................. H04W 80/04; H04W 88/06
USPC .................................................. 370/328, 332
See application file for complete search history.

(56) References Cited

U.S. PATENT DOCUMENTS

| | | | | |
|---|---|---|---|---|
| 8,509,199 | B2 * | 8/2013 | Won .............................. | 370/338 |
| 2004/0229606 | A1 * | 11/2004 | Oshima et al. ............. | 455/426.2 |
| 2004/0248557 | A1 * | 12/2004 | Muratsu ........................ | 455/411 |
| 2006/0067290 | A1 | 3/2006 | Miwa | |
| 2008/0198811 | A1 * | 8/2008 | Deshpande et al. .......... | 370/332 |
| 2010/0325235 | A1 | 12/2010 | Konno | |
| 2012/0054297 | A1 | 3/2012 | Konno | |

FOREIGN PATENT DOCUMENTS

| | | | |
|---|---|---|---|
| JP | 2008129735 | A | 6/2008 |
| JP | 2011000309 | A | 1/2011 |

OTHER PUBLICATIONS

Office Action issued for corresponding Japanese Patent Application No. 2011-273735, dated Sep. 24, 2013.

* cited by examiner

*Primary Examiner* — Omar Ghowrwal
*Assistant Examiner* — Angel Brockman
(74) *Attorney, Agent, or Firm* — Matthew B. Dernier, Esq.; Gibson & Dernier LLP

(57) ABSTRACT

An application execution unit executes an application, and a communication ID acquisition unit acquires a communication identifier set for the application. When a packet generation unit generates a packet including a communication identifier and data, a transmission unit transmits the packet in an IBSS identified by an SSID stored in a SSID storing unit. When a reception unit receives a packet from another terminal device, a determination unit determines whether the communication identifier acquired by the communication ID acquisition unit matches a communication identifier included in the received packet. When the determination unit determines that the acquired communication identifier matches the communication identifier included in the received packet, a data supply unit provides data included in the received packet to the application.

5 Claims, 5 Drawing Sheets

TERMINAL DEVICE AND DATA TRANSMISSION/RECEPTION METHOD

BACKGROUND OF THE INVENTION

1. Field of the Invention

The present invention relates to a technique for communicating among a plurality of terminal devices.

2. Description of the Related Art

In a wireless network using IEEE 802.11, a BSS (Basic Service Set) is defined as a basic unit constituting a group of terminals that communicate with one another, and terminals that belong to the same BSS communicate with one another. A BSS is identified by a BSSID (Basic Service Set ID), and a unique value is assigned to a BSSID in the environment. Besides a BSSID, there exists an SSID (Service Set ID) that can be arbitrarily set to identify a BSS.

When using a wireless network using IEEE 802.11, a terminal needs to belong to any BSS. Therefore, a terminal searches (performs scanning) for a BSS that exists around the terminal. If the terminal knows the SSID of a desired group, the terminal needs to specify the SSID. On the other hand, if the terminal does not know the SSID, the terminal searches for all BSS's that exist around the terminal so as to select one SSID from SSID's that have been searched for.

Patent document No. 1 suggests a mechanism of establishing a BSS that is different for each application by setting an SSID including an application ID and allowing terminals that execute the same application to communicate with one another.

[Patent document No. 1] US Patent Publication No. 2006/0067290

According to patent document No. 1, since an SSID is set for each application, terminals that execute different applications cannot connect to one another. If a processing function of a terminal is improved such that the terminal can concurrently execute a plurality of applications, communication is made only for a single application in the mechanism described in patent document No. 1 since an SSID is set limitedly for a single application.

SUMMARY OF THE INVENTION

In this background, a purpose of the present invention is to provide a technology that allows a plurality of applications to communicate at the same time.

A terminal device according to one embodiment of the present invention is configured to be connected to a wireless network identified by a predetermined network identifier and includes: an execution unit configured to execute an application; an acquisition unit configured to acquire a communication identifier set for the application; a transmission unit configured to transmit a packet including a communication identifier and data; a reception unit configured to receive a packet from another terminal device; and a determination unit configured to determine whether the communication identifier acquired by the acquisition unit matches a communication identifier included in the received packet.

Another embodiment of the present invention relates to a data transmission/reception method. This method includes: storing a predetermined network identifier; acquiring a communication identifier set for an application; transmitting a packet including a communication identifier and data in a wireless network identified by a predetermined network identifier; receiving a packet from another terminal device; and determining whether the acquired communication identifier matches a communication identifier included in the received packet.

Optional combinations of the aforementioned constituting elements and implementations of the invention in the form of methods, apparatuses, systems, recording mediums, and computer programs may also be practiced as additional modes of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention, but to exemplify the invention.

Figure 1:
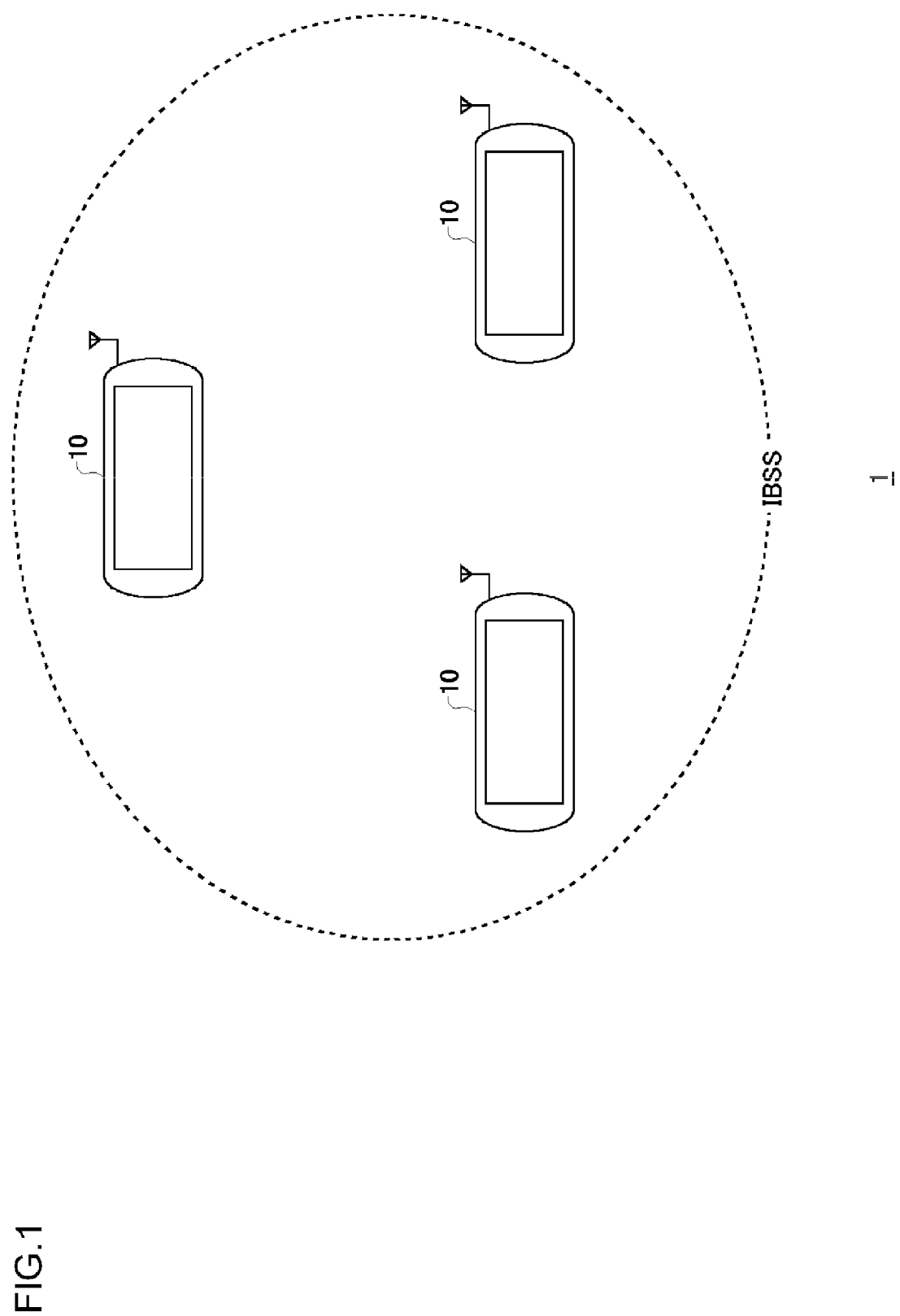
FIG. 1 is a diagram illustrating an information processing system according to an exemplary embodiment.

FIG. 1 illustrates an information processing system 1 according to an exemplary embodiment. The information processing system 1 is provided with a plurality of terminal devices 10, and the plurality of terminal devices 10 establish an ad hoc network using IEEE 802.11. In the figure, an IBSS (Independent Basic Service Set) corresponds to a wireless network. By specifying a network identifier (in this case, SSID) of the IBSS, a terminal device 10 that has a wireless communication function can join the IBSS so as to become connected to another station. While the figure shows three terminal devices 10, the number of terminal devices is non-restrictive. In the information processing system 1, the plurality of terminal devices 10 have the same SSID. Therefore, each terminal device 10 can easily belong to an IBSS identified by the stored SSID and thus establish a wireless link with another terminal device 10.

A terminal device 10 is a game device. It is preferable that when all game devices that belong to an IBSS are executing games having a same game title, game data are transmitted and/or received among all the game devices, and each game device reflects game data that is transmitted from other game devices in game processing. Game data contains operation data that is input to a game device by a user. Meanwhile, when a plurality of game devices that belong to an IBSS are executing games having different game titles, a game device needs to avoid processing game data provided from a game device that is executing a different game. Thus, when transmitting game data in a packet, the terminal device 10 includes a title-specific communication identifier in the packet, and the terminal device 10 which receives the packet can filter the packet based on the communication identifier in the information processing system 1 according to the exemplary embodiment.

An explanation is given regarding the exterior configuration and circuit configuration of a terminal device according to the present exemplary embodiment. The terminal device shown in the following is a portable game device. However, the terminal device may be a portable terminal device of other types.

[Configuration of Front Surface Portion]

Figure 2A:
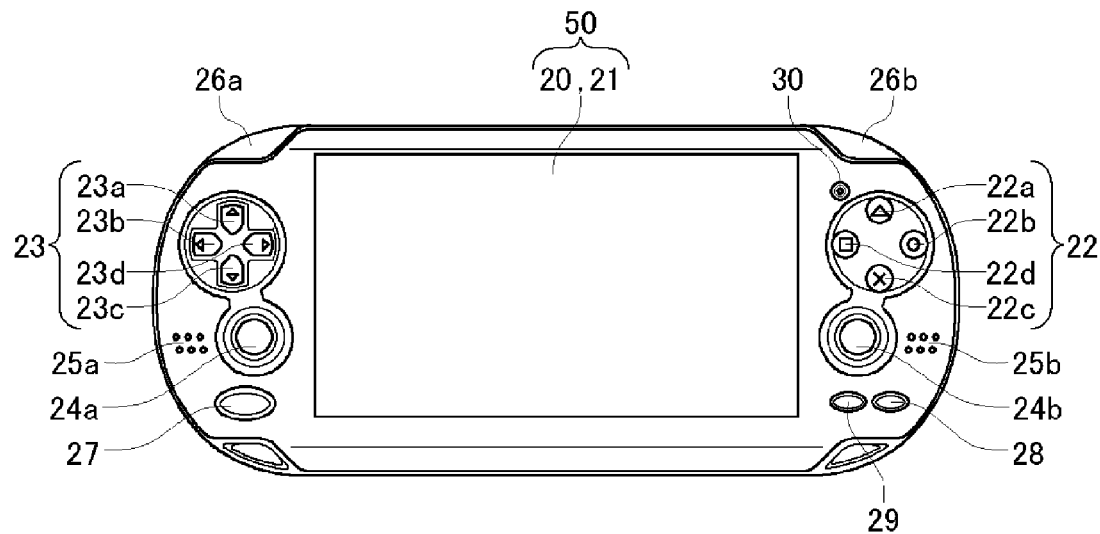
FIG. 2A is a diagram illustrating the front surface of a terminal device.

FIG. 2A illustrates the front surface of a terminal device 10. The terminal device 10 is formed of a horizontally-long housing, and the left and right areas held by the user each have an arc-shaped outline contour. A rectangular touch panel 50 is provided on the front surface of the terminal device 10. The touch panel 50 comprises a display device 20 and a transparent front touch pad 21 that covers the surface of the display device 20. The display device 20 is an organic EL (Electro-Liminescence) panel and displays an image. The display device 20 may be a display means such as a liquid crystal panel or the like. The front touch pad 21 is a multi-touch pad having a function of detecting a plurality of points that are touched concurrently, and the touch panel 50 is formed as a multi-touch screen.

A triangle button 22a, a circle button 22b, a cross button 22c, and a square button 22d each located at a vertex of a rhomboid (hereinafter, generically referred to as "operation buttons 22") are provided on the right side of the touch panel 50. An up key 23a, a left key 23b, a down key 23c, and a right key 23d (hereinafter, generically referred to as "directional keys 23") are provided on the left side of the touch panel 50. The user can input eight directions, up, down, left, and right directions and oblique directions, by operating the directional keys 23. A left stick 24a is provided below the directional keys 23, and a right stick 24b is provided below the operation buttons 22. The user tilts the left stick 24a or the right stick 24b (hereinafter, generically referred to as "analog sticks 24") so as to input a direction and the amount of a tilt. An L button 26a and an R button 26b are provided at the left and right top of the housing, respectively. The operation buttons 22, the directional keys 23, the analog sticks 24, the L button 26a, and the R button 26b form operation means operated by the user.

A front camera 30 is provided near the operation buttons 22. A left speaker 25a and a right speaker 25b that output sounds (hereinafter, generically referred to as "speakers 25") are provided on the left side of the left stick 24a and on the right side of the right stick 24b, respectively. A HOME button 27 is provided below the left stick 24a, and a START button 28 and a SELECT button 29 are provided below the right stick 24b.

[Configuration of Rear Surface Portion]

Figure 2B:
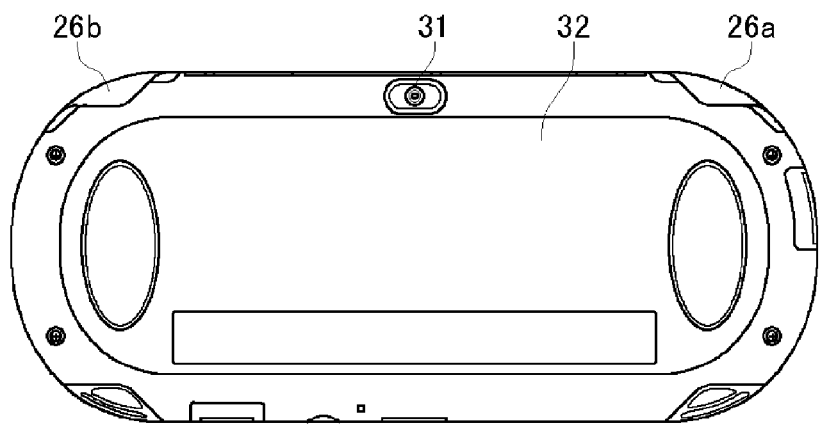
FIG. 2B is a diagram illustrating the rear surface of the terminal device.

FIG. 2B illustrates the rear surface of the terminal device 10. A rear camera 31 and a rear touch pad 32 are provided on the rear surface of the terminal device 10. The rear touch pad 32, as in the case of the front touch pad 21, is formed as a multi-touch pad. The terminal device 10 is provided with the two cameras and touch pads on the front and rear surfaces.

[Configuration of Upper Surface Portion]

Figure 3A:
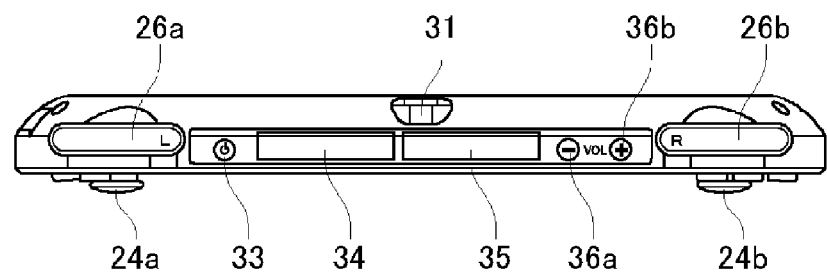
FIG. 3A is a diagram illustrating the upper surface of the terminal device.

FIG. 3A illustrates the upper surface of the terminal device 10. As described previously, the L button 26a and the R button 26b are provided at the left and right edges of the upper surface of the terminal device 10, respectively. A power button 33 is provided on the right side of the L button 26a, and the user turns the power on or off by pressing the power button 33 for at least a predetermined period of time (e.g., two seconds). The terminal device 10 has a power control function of transitioning to a suspend state when a time period during which the operation means is not operated (no operation time period) lasts for a predetermined period of time. When the terminal device 10 enters the suspend state, the user can bring the terminal device 10 back to an awake state from the suspend state by pressing the power button 33 for a short period of time (e.g., two seconds or less).

A game card slot 34 is a slot for inserting a game card. In the figure, the game card slot 34 covered by a slot cover is shown. An LED lamp that flashes when the game card is being accessed may be provided near the game card slot 34. An accessory terminal 35 is for connecting peripheral devices (accessories). In the figure, the accessory terminal 35 is shown being covered by a terminal cover. A negative button 36a and a positive button 36b for adjusting the volume are provided between the accessory terminal 35 and the R button 26b.

[Configuration of Bottom Surface Portion]

Figure 3B:
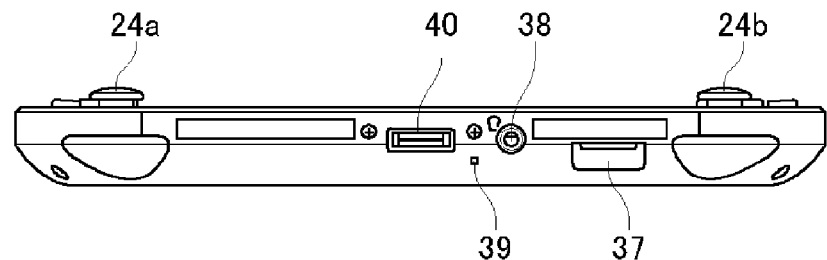
FIG. 3B is a diagram illustrating the bottom surface of the terminal device.

FIG. 3B illustrates the bottom surface of the terminal device 10. A memory card slot 37 is a slot for inserting a memory card. In the figure, the memory card slot 37 covered by a slot cover is shown. A sound input and output terminal 38, a microphone 39, and a multi-use terminal 40 are provided on the bottom surface of the terminal device 10. The multi-use terminal 40 is compatible with a USB (Universal Serial Bus) and can be connected to other devices via a USB cable.

[Configuration of Left Side Surface Portion]

Figure 3C:
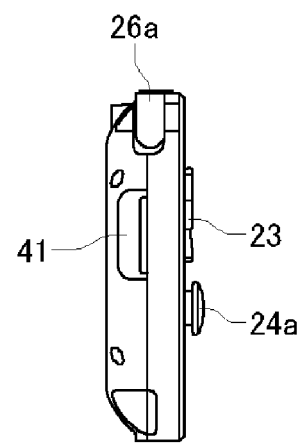
FIG. 3C is a diagram illustrating the left side surface of the terminal device.

FIG. 3C illustrates the left side surface of the terminal device 10. A SIM card slot 41 serving as a slot for inserting a SIM card is provided on the left side surface of the terminal device 10.

[Circuit Configuration of Terminal Device]

Figure 4:
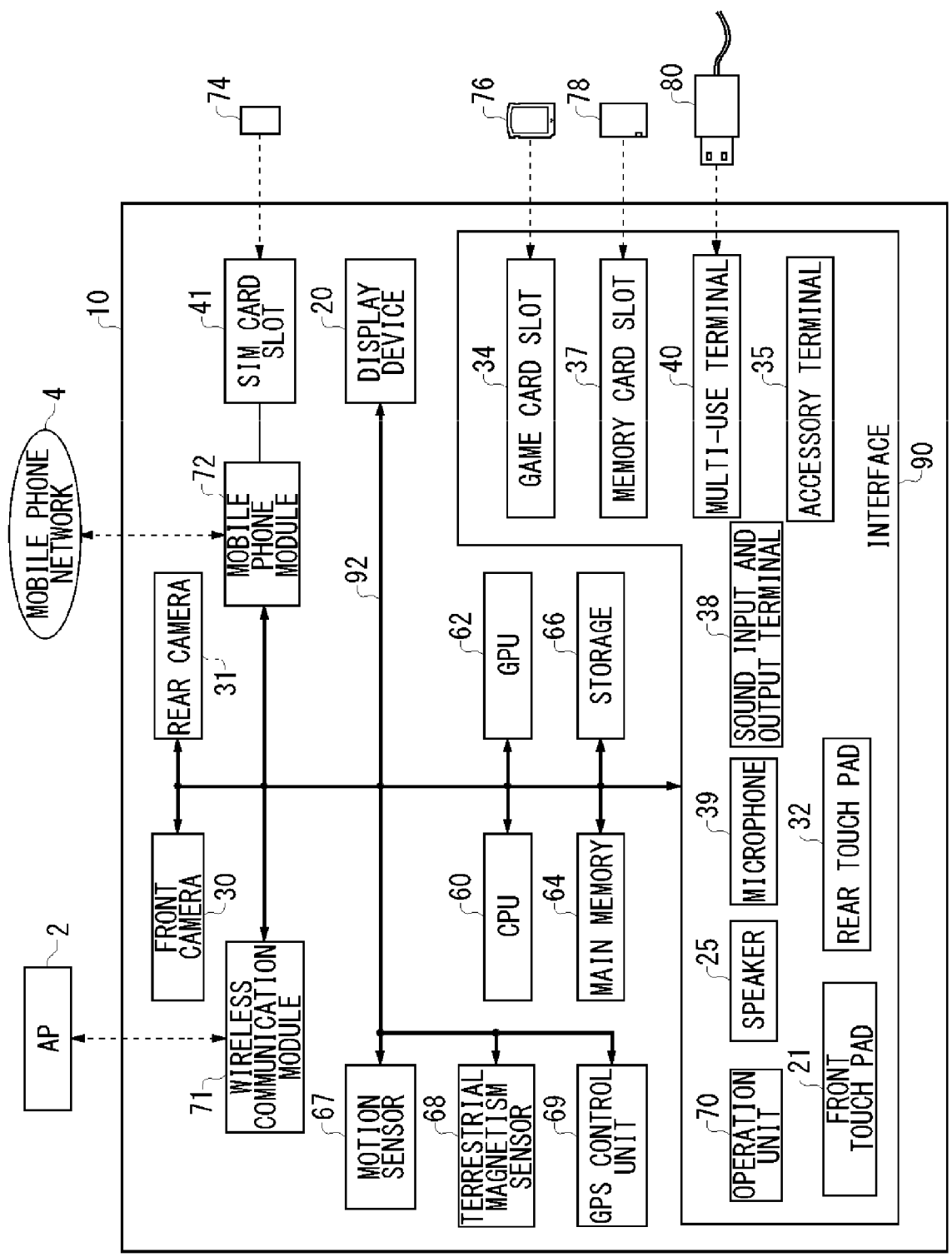
FIG. 4 is a diagram illustrating the circuit configuration of the terminal device.

FIG. 4 illustrates the circuit configuration of the terminal device 10. Components thereof are connected to one another via a bus 92. A wireless communication module 71 is formed with a wireless LAN module that complies with the communication standard of IEEE 802.11b/g or the like and is connected to an external network via an AP 2. The wireless communication module 71 may have a communication function in Bluetooth (registered trademark) protocol. A mobile phone module 72 is compatible with a 3rd generation digital mobile phone method that complies with the IMT-2000 (International Mobile Telecommunication 2000) standard set by ITU (International Telecommunications Union) and is connected to a mobile phone network 4. A SIM card 74 in which a unique ID number for identifying the phone number of a mobile phone is recorded is inserted into the SIM card slot 41. The SIM card 74 being inserted into the SIM card slot 41 allows the mobile phone module 72 to communicate with the mobile phone network 4.

The terminal device 10 can establish an ad hoc network with another terminal device 10 using the wireless communication module 71. In this case, the terminal devices 10 can become directly connected to one another without requiring a infrastructure such as an AP2.

A CPU (Central Processing Unit) 60 executes a program or the like loaded in a main memory 64. A GPU (Graphics Processing Unit) 62 performs calculation necessary for image processing. The main memory 64 is configured with RAM (Random Access Memory) or the like and stores a program or data used by the CPU 60. A storage 66 is configured with a NAND-type flash memory or the like and used as a built-in auxiliary storage device.

A motion sensor 67 detects the behavior of the terminal device 10, and a terrestrial magnetism sensor 68 detects terrestrial magnetism in a triaxial direction. A GPS control unit 69 receives a signal from a GPS satellite and calculates a current position. The front camera 30 and the rear camera 31 each capture an image and enter image data. The front camera 30 and the rear camera 31 are configured with a CMOS image sensor (Complementary Metal Oxide Semiconductor Image Sensor).

The display device 20 is an organic EL display device and has a light emitting device that emits light by applying voltage to the cathode and anode thereof. During a power saving mode, a voltage that is smaller than usual is applied between the electrodes such that the display device 20 is in a dimmed-light state. Thus, power consumption can be cut. The display device 20 may be a liquid crystal panel display device provided with a backlight. During the power saving mode, the amount of light of the backlight is reduced such that the liquid crystal panel display device is in a dimmed-light state. Thus, power consumption can be cut.

In an interface 90, an operation unit 70 includes various operation means provided in the terminal device 10. More specifically, the operation unit 70 includes the operation buttons 22, the directional keys 23, the analog sticks 24, the L button 26a, the R button 26b, the HOME button 27, the START button 28, the SELECT button 29, the power button 33, the negative button 36a, and the positive button 36b. The front touch pad 21 and the rear touch pad 32 are multi-touch pads, and the front touch pad 21 is arranged being overlaid on the surface of the display device 20. The speakers 25 output a sound created by the functions of the terminal device 10, and the microphone 39 inputs a sound from around the terminal device 10. The sound input and output terminal 38 inputs a stereo sound from the external microphone and outputs the stereo sound to an external headphone or the like.

A game card 76 in which a game file is recorded is inserted into the game card slot 34. The game card 76 has a data-writable recording area. When the game card 76 is placed in the game card slot 34, data is written or read by a media drive. A memory card 78 is inserted into the memory card slot 37. The memory card 78, when placed in the memory card slot 37, is used as an external auxiliary storage device. The multi-use terminal 40 can be used as a USB terminal and exchanges data with another USB device when the USB cable 80 is connected to the multi-use terminal 40. To the accessory terminal 35, a peripheral device is connected.

The terminal device 10 according to the present exemplary embodiment has a function of storing a predetermined SSID and getting connected to a wireless network identified by the stored SSID. In the information processing system 1, having a common SSID, all terminal devices 10 having the configuration shown in FIGS. 2-4 can be connected to a common IBSS. Meanwhile, a terminal device 10 is a game device that processes game data transmitted from another game device that is executing the same application. However, it is not necessary for the terminal device 10 to process game data transmitted from another game device that is executing a different application. Rather, an unnecessary and excessive load is merely caused by processing game data transmitted from another game device that is executing a different application.

In the information processing system 1, a mechanism is provided, where all the terminal devices 10 belong to the same wireless network such that wireless links are provided among all the terminal devices 10, that allows data to be acquired among terminal devices 10 executing the same application and that prevents data from being acquired among terminal devices 10 executing different applications.

Figure 5:
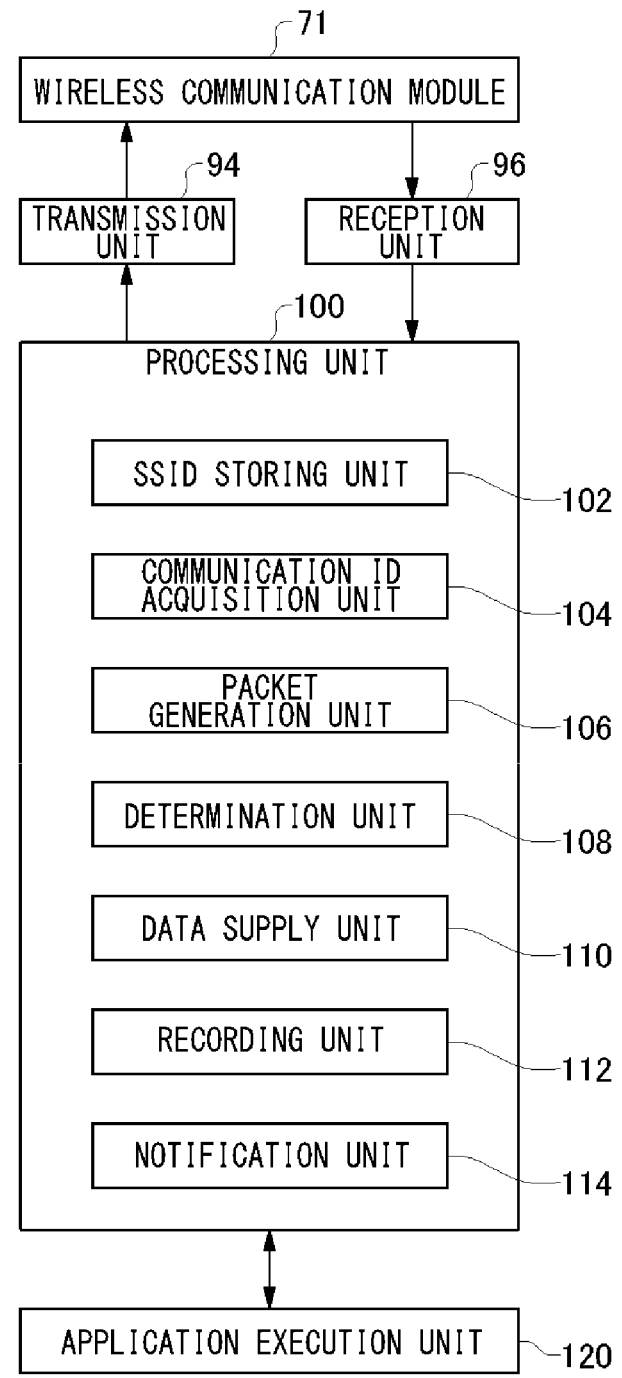
FIG. 5 is a diagram illustrating functional blocks for achieving a data transmission/reception function in the terminal device.

FIG. 5 illustrates functional blocks for achieving a data transmission/reception function in the terminal device 10. A processing unit 100 is provided with an SSID storing unit 102, a communication ID acquisition unit 104, a packet generation unit 106, a determination unit 108, a data supply unit 110, a recording unit 112, and a notification unit 114 and performs processing and management related to data transmission/reception. An application execution unit 120 executes an application. The application execution unit 120 may execute the application on the foreground in accordance with an explicit instruction from the user. Alternatively, the application execution unit 120 may execute the application on the background in accordance with a preset schedule. The application execution unit 120 can concurrently execute a plurality of applications.

The configuration shown in FIG. 5 is implemented in hardware component by any CPU of a computer, a memory or a program loaded into the memory. Functional blocks are implemented by the cooperation of hardware components. Thus, a person skilled in the art should appreciate that there are many ways of accomplishing these functional blocks in various forms in accordance with the components of hardware only, software only, or the combination of both.

The application execution unit 120 executes a multiplayer online application that allows a plurality of users to join. Games and chats are typical examples of this application. The application may be of other types. When the application execution unit 120 executes an application, the communication ID acquisition unit 104 acquires a communication identifier (hereinafter, referred to as "communication ID") set for the application at arbitrary time.

A communication ID is described in an application program, and the communication ID acquisition unit 104 acquires the communication ID from the application at the time when a request for transmitting and/or receiving data is received from the application. The communication ID acquisition unit 104 may acquire the communication ID from the application when the application is started. Alternatively, the communication ID acquisition unit 104 may acquire the communication ID from the application when a connection to a wireless network is selected by the user during the execution of the application. The communication ID may be uniquely created based on an application ID described in the application program.

The SSID storing unit 102 stores an SSID, which is a network identifier. This SSID is a network identifier that is commonly set in the information processing system 1. All the terminal devices 10 have the same SSID. This SSID may be preinstalled in a flash memory or the like at the time of shipment of a terminal device 10. The terminal device 10 selects the SSID stored in the SSID storing unit 102 and becomes connected to an IBSS. The other terminal devices 10 have the same SSID. Therefore, all the terminal devices 10 in the information processing system 1 become connected to the single IBSS.

The terminal device 10 executes an application, transmits game data to other terminal devices 10 executing the same application, and acquires game data from the other terminal devices 10. In the application execution unit 120, an application generates game data to be transmitted to the other terminal devices 10. Game data is, for example, data entered by the user for operating a character. The packet generation unit 106 generates a packet that includes at least the SSID stored in the SSID storing unit 102, the communication ID acquired by the communication ID acquisition unit 104, and the game data generated by the application.

The application execution unit 120 can concurrently execute a plurality of applications. For example, the application execution unit 120 may execute a chat application concurrently while executing a game program. When the plurality of applications notify the communication ID acquisition unit 104 of a request for transmitting and/or receiving data, the communication ID acquisition unit 104 acquires respective communication ID's from the plurality of applications. Therefore, when game data to be transmitted is generated by a single application, the packet generation unit 106 generates a packet that includes the generated game data and a communication ID that corresponds to the application. When the packet generation unit 106 generates a packet, as described above, a transmission unit 94 transmits the packet via the wireless communication module 71.

In the information processing system 1, the other terminal devices 10 also transmit a packet in the same way. A reception unit 96 receives the packet from the other terminal devices 10 via the wireless communication module 71. In the information processing system 1, the other terminal devices 10 are also connected to the same IBSS. Thus, the reception unit 96 receives the packet transmitted from all the terminal devices 10.

The determination unit 108 determines whether the communication ID acquired by the communication ID acquisition unit 104 matches a communication ID included in the packet received by the reception unit 96. This determination process is performed to check whether data included in the received packet is directed to the application being executed by the application execution unit 120. When it is determined that the communication ID acquired by the communication ID acquisition unit 104 matches the communication ID included in the packet received by the reception unit 96, the data supply unit 110 provides the data included in the received packet to the application being executed by the application execution unit 120. With this, the application execution unit 120 can reflect the data from other users playing the same game together in the processing of the application.

When the application execution unit 120 is executing a plurality of applications, the communication ID acquisition unit 104 acquires a plurality of communication ID's. Therefore, the determination unit 108 determines whether any one of the communication ID's acquired by the communication ID acquisition unit 104 matches the communication ID included in the received packet. When the communication ID matched any one of the communication ID's, the data supply unit 110 provides the data included in the received packet to an application having the matching communication ID. As described, in the information processing system 1, all the terminal devices 10 are connected to a wireless network identified by the same SSID, and data can be transmitted and/or received for a plurality of applications in a single terminal device 10 by differentiating the applications based on communication ID's.

On the other hand, when the communication ID acquired by the communication ID acquisition unit 104 does not match the communication ID included in the packet received by the reception unit 96, the determination unit 108 comes to recognize that the received packet is irrelevant to the application being executed by the application execution unit 120. Therefore, data included in the received packet will not be passed over to the application by the data supply unit 110.

Although the data included in the received packet is unnecessary for the terminal device 10, the recording unit 112 may record the communication ID included in the received packet. By having a common SSID, a packet can be also received from other terminal devices 10 executing a different application in the information processing system 1. Thus, the recording unit 112 can record the communication ID included in the received packet as described above. The recording unit 112 extracts the communication ID from the packet and records the communication ID. However, the recording unit 112 discards data included in the packet and does not record the data. This allows a recording amount to be reduced compared to that required when the entire packet is recorded.

The notification unit 114 may notify the user of the name of an application that corresponds to the communication ID recorded in the recording unit 112. This notification may be given by, for example, displaying a message, "somebody playing title ABCD is around," on the display device 20. By reading this message, the user can realize that he/she can play a game together with another user if he/she starts a game titled ABCD.

The notification unit 114 stores a table mapping a communication ID to the name of an application. For example, for a game the user has played in the past on the terminal device 10, the notification unit 114 may store a communication ID and the name of the title thereof in a table mapping the communication ID and the name of the title. This table is updated when the communication ID acquisition unit 104 first acquires a communication ID from a game after the game is started. Therefore, both a list of the respective names of the titles played by the user and respective communication ID's assigned to the names of the titles are recorded in the table.

In reference to the table, the notification unit 114 reads out the name of an application that corresponds to a communication ID recorded in the recording unit 112 and displays a message on the display device 20. This allows the user to realize that a game in which the user can participate is being played around the user. As described, in the information processing system 1, a terminal device 10 receives a packet from other terminal devices 10, and the notification unit 114 can thus notify the user of the status of a terminal device 10 that exists around the user.

Meanwhile, if a communication ID recorded in the recording unit 112 is not included in the table, the notification unit 114 cannot notify the user of the name of an application on the spot. In this case, the notification unit 114 may query the server the name of the application that corresponds to the communication ID at arbitrary time. After the server query processing, the notification unit 114 can notify the user that a different game was being played around the user in the past.

Described above is an explanation of the present invention based on the embodiments. These embodiments are intended to be illustrative only, and it will be obvious to those skilled in the art that various modifications to constituting elements and processes could be developed and that such modifications are also within the scope of the present invention. In the exemplary embodiment, the determination unit 108 formed in the processing unit 100 determines whether a communication ID is matching. However, the wireless communication module 71 may have a function of the determination unit 108 and perform filtering.

In the exemplary embodiment, it is explained that a communication ID is set for each application. A single communication ID is set for an application. However, a plurality of applications may share a single communication ID. A plurality of applications using a single communication ID allows an environment to be provided where data is transmitted and/or received among different applications.

When the same title is played among a plurality of groups in an IBSS, a group ID for identifying each group may be set and included in a packet. In this case, the application execution unit 120 stores the own group ID in advance and reflects, in the processing of an application, only game data with a group ID that is the same as the stored group ID. The determination unit 108 may perform a determination process of a group ID after a determination process of a communication ID. The data supply unit 110 may provide game data to the application only when a communication ID and a group ID are determined to be matching by the determination unit 108.

In the exemplary embodiment, when the communication ID acquisition unit 104 acquires a communication ID from the application, the communication ID acquisition unit 104 stores the communication ID in a predetermined recording area, and the determination unit 108 determines whether the communication ID stored in the predetermined recording area matches a communication ID included in a received packet. A communication ID of a predetermined application may be registered in advance in the predetermined recording area. Particularly, the respective communication ID'S of those that communicate using an application installed in advance in a terminal device 10 (the application is also referred to as a system application) may be registered in advance. As explained in the exemplary embodiment, the system application may provide a communication ID to the communication ID acquisition unit 104 after start-up.

If the application is not started when the determination unit 108 determines that a communication ID registered in advance matches a communication ID included in received packet, the application execution unit 120 may start the application. The data supply unit 110 provides data included in the received packet to the application after the start-up of the application. In this case, the data included in the received packet may be stored in advance, and the data supply unit 110 may provide the stored data to the application when the application execution unit 120 starts the application. The data included in the received packet may be discarded if the application is not started.

An example where a single communication ID is set for an application is shown in the exemplary embodiment. However, a plurality of communication ID's may be set. By setting one of a plurality of communication ID's as a communication ID set in common for a plurality of types of applications, the plurality of types of applications can transmit and/or receive data using the common communication ID.

The application may determine whether or not to encrypt data to be transmitted. In other words, a given application encrypts transmitted data, and another application does not encrypt transmitted data. Filtering using a communication ID may not be performed, and a special application may exist that processes all received data. This application allows the user to view data included in a received packet regardless of a communication ID. When the application is installed, the recording unit 112 may record data in addition to a communication ID. When the application is being started, the data supply unit 110 provides received data to the application. The data supply unit 110 may provide only unencrypted data to the application.

What is claimed is:

1. A first terminal device configured to be connected to a wireless network identified by a predetermined network identifier, the first terminal device comprising:
    an execution unit configured to execute an application on said first terminal device;
    a reception unit configured to receive a packet from a second terminal device, said packet comprising:
        a communication identifier associated with an application running on said second terminal device, and
        application data from said application running on said second terminal device;
    an acquisition unit configured to acquire a communication identifier associated with an application running on said first terminal device,
        wherein said first terminal device processes said application data from said second terminal device when said communication identifier associated with said application running on said second terminal device corresponds to said
        communication identifier associated with said application running on said first terminal device;
    a transmission unit configured to transmit a packet including said communication identifier associated with said application running on said first terminal device along with application data from said application running on said first terminal to the second terminal device;
    a determination unit wherein said determination unit determines whether the communication identifier acquired by the acquisition unit matches the communication identifier included in the packet received from the second terminal device, wherein a match between the communication identifiers indicates that the terminal devices are running the same application, and application data may be processed and shared between them;
    a recording unit configured to record the communication identifier included in the received packet when the determination unit determines that the communication identifier acquired by the acquisition unit does not match the communication identifier included in the received packet; and
    a notification unit configured to notify the user of the name of an application corresponding to the communication identifier recorded in the recording unit.

2. The terminal device according to claim 1, further comprising:
    a data supply unit configured to provide data to an application,
    wherein, when the determination unit determines that the communication identifier acquired by the acquisition unit matches the communication identifier included in the received packet, said match indicating that the same application is running on the second terminal device that transmitted the packet and the first terminal device that received the packet, and allows the terminal devices to share application data included in the packet via the data supply unit.

3. The terminal device according to claim 1,
    wherein the execution unit can execute a plurality of applications, and
    wherein the acquisition unit acquires communication identifiers from the plurality of applications when the plurality of applications are being executed.

4. A method carried out by a plurality of modules of a first terminal device, said method comprising:
    storing a predetermined network identifier within the first terminal device;
    receiving a packet from a second terminal device, said packet comprising: (i) a communication identifier associated with an application running on the second terminal device, and (ii) application data from the application running on the second terminal device:
    acquiring a communication identifier associated with an application running on the first terminal device, wherein the first terminal device processes the application data from the second terminal device when the communication identifier associated with the application running on the second terminal device corresponds to the communication identifier associated with the application running on the first terminal device;
    transmitting a packet including the communication identifier associated with the application running on the first terminal device and the application data generated from the application running on the first terminal to the second terminal device;

determining whether the acquired communication identifier matches the communication identifier included in the packet received from the second terminal device, wherein a match between the communication identifiers indicates that the terminal devices are running the same application, and application data may be processed and shared between them;

recording the communication identifier included in the received packet when the determination is that the communication identifier acquired by the acquisition unit does not match the communication identifier included in the received packet; and notifying a user of the name of an application corresponding to the communication identifier recorded in the recording unit.

5. A non-transitory computer-readable recording medium containing a computer program, the computer program executed by a computer provided in a first terminal device identified by a predetermined network identifier, the computer program comprising:

computer instructions configured to receive a packet from a second terminal device, said packet comprising: (i) a communication identifier associated with an application running on the second terminal device, and (ii) application data from the application running on the second terminal device;

a module configured to acquire a communication identifier associated with an application running on the first terminal device, wherein the first terminal device processes the application data from the second terminal device when the communication identifier associated with the application running on the second terminal device corresponds to the communication identifier associated with the application running on the first terminal device;

a module configured to transmit a packet including the communication identifier associated with the application running on said first terminal device and the application data generated from the application running on the first terminal to the second terminal device;

a module configured to determine whether the acquired communication identifier matches the communication identifier included in the packet received from the second terminal device, wherein a match between the communication identifiers indicates that the terminal devices are running the same application, and application data may be processed and shared between them;

a module configured to record the communication identifier included in the received packet when the determination is that the communication identifier acquired by the acquisition unit does not match the communication identifier included in the received packet; and a module configured to notify a user of the name of an application corresponding to the communication identifier recorded in the recording unit.

\* \* \* \* \*